United States Patent [19]

Suzuki

[11] Patent Number: 4,495,611
[45] Date of Patent: Jan. 22, 1985

[54] VIBRATION SYSTEM OF PICKUP CARTRIDGE OF RECORD PLAYER

[75] Inventor: Yoshiaki Suzuki, Hamamatsu, Japan

[73] Assignee: Nippon Gakki Seizo Kabushiki Kaisha, Hamamatsu, Japan

[21] Appl. No.: 405,902

[22] Filed: Aug. 6, 1982

[30] Foreign Application Priority Data

Aug. 14, 1981 [JP] Japan .................. 56-120914[U]

[51] Int. Cl.³ .................................. G11B 3/50
[52] U.S. Cl. .................................. 369/170; 369/139
[58] Field of Search ............ 369/170, 173, 135, 139, 369/148, 146, 147

[56] References Cited

U.S. PATENT DOCUMENTS

| | | | |
|---|---|---|---|
| 3,136,554 | 6/1964 | De Vries | 369/171 |
| 3,720,796 | 3/1973 | Honma | 369/139 |
| 4,089,530 | 5/1978 | Kawabe et al. | 369/171 |
| 4,138,122 | 2/1979 | Nakatsuka | 369/170 |
| 4,209,669 | 6/1980 | Hayashi | 369/170 |
| 4,263,483 | 4/1981 | Obata | 369/139 |
| 4,385,375 | 5/1983 | Okuta et al. | 369/147 |

FOREIGN PATENT DOCUMENTS

| | | | |
|---|---|---|---|
| 55-97005 | 7/1980 | Japan | 369/170 |
| 55-125508 | 9/1980 | Japan | 369/173 |
| 56-25209 | 3/1981 | Japan | 369/170 |

Primary Examiner—Charles Frankfort
Assistant Examiner—Thomas P. Matecki
Attorney, Agent, or Firm—Cushman, Darby & Cushman

[57] ABSTRACT

In the vibration system of a pickup cartridge of a record player, the object of preliminarily applying a required deforming bias, in a direction opposite to the direction of the vertical tracking force, to the damper which deforms with the application of a vertical tracking force, and of releasing this deforming bias when the stylus is actually applied with a vertical tracking force, is achieved by arranging the cantilever-supporting tension wire which pulls the cantilever in the rearward direction, so as to pass through the damper at a position eccentric relative to the center of this damper which is disposed between the armature-carrying cantilever and the tension wire holder.

12 Claims, 9 Drawing Figures

VIBRATION SYSTEM OF PICKUP CARTRIDGE OF RECORD PLAYER

BACKGROUND OF THE INVENTION (a) Field of the Invention

The present invention relates to the vibration system of a pickup cartridge of a record player, and more particularly it pertains to a vibration system of a pickup cartridge having a damper which is deformed with the application of a vertical tracking force.

(b) Description of the Prior Art

In a pickup cartridge having a damper in the vibration system, in general, a required amount of vertical tracking force is applied to the stylus as the stylus tip is brought into contact with the record groove on a record disc surface, whereby the damper is caused to be deformed for an amount corresponding to the vertical tracking force applied actually during the play of the record disc. As a result, the stylus tip and the cantilever having this stylus at its forward end portion will be rendered to the state of being moved upwardly about the fulcrum of the vibrating system.

Therefore, an arrangement has been considered so that in the non-tracing state, wherein the stylus tip is free of any vertical tracking force (which will hereinafter be referred to as VTF), both the stylus tip and the cantilever are held in the state of having been displaced or moved downwardly for a required amount by taking the VTF into account, and that, in the state wherein the stylus tip is applied with a VTF as it is brought into contact with the record groove on a record disc surface, a preliminarily intended vertical tracking angle can be obtained.

As the means of imparting such displacement to the vibration system of a pickup cartridge, there has been known the arrangements as shown in, for example, FIGS. 1 and 2.

The examples of vibration systems of pickup arm cartridges shown in FIGS. 1 and 2, are simply arranged as follows: a plate-like armature 3 is fixed to the rear end portion of a cantilever 2 having a stylus tip 1 at its forward end portion; a damper 4 is disposed rearwardly of both the rear end portion of the cantilever 2 and the armature 3; a holder 5 is disposed rearwardly of the damper 4; an end of a tension wire 6 is fixed to the rear end portion of the cantilever 2; the other end portion of the tension wire 6 is passed through the damper 4 to extend through the holder 5; and this other end of the tension wire 6 is fixed in a tensioned state within the holder 5. In this arrangement, the vibration system shown in FIG. 1 is arranged so that the front surface 4a of the damper 4 is formed to provide a slanted surface, by decreasing the thickness of the damper 4 as it goes from the upper edge to the lower edge, so as to impart a displacement to both the stylus tip 1 and the cantilever 2. Also, the vibration system shown in FIG. 2 is arranged so that by slanting the front surface 5a of the holder 5 a similar displacement is imparted.

Now, in the above-mentioned means of imparting a displacement, the damper 4, which, ordinarily, is made of an elastic member such as rubber or synthetic rubber, is brought to a state in which a required pressure bias is applied at the time of tracing the record groove of a record disc. Such an elastic member, i.e., the damper mentioned above, has a non-linear stress-strain characteristic as shown in FIG. 3. If it is assumed here that the pressure in the direction of VTF and also the displacement caused by this pressure take place in the positive direction, it will be noted that, in the instance of FIG. 1, the displacement caused by the pressure applied in the negative direction becomes greater than the displacement caused by the pressure in the positive direction. In contrast thereto, in the instance of FIG. 2, the displacements related to both the positive and negative pressures are of such characteristic that they are equal to each other, as shown by the dotted line in FIG. 3.

In each case, it will be noted that, at the time of tracing a record groove, the damper 4 is rendered to the state in which a predetermined pressure bias has been applied, as shown by point C of FIG. 3, and that, accordingly, the stress-strain characteristic of the elastic member is no longer centered around zero. Accordingly, such non-linear strain as indicated by ΔD and ΔD' relative to the upward and downward movements of the stylus, respectively, are exhibited, adversely affecting the movement of the armature, and accordingly degrading the quality of the sounds reproduced.

Furthermore, in the prior art, there are the drawbacks that, in the arrangement of FIG. 1, the damper 4 is difficult to mold, whereas in the arrangement of FIG. 2, the machining of the holder 5 is troublesome.

SUMMARY OF THE INVENTION

It is, therefore, a primary object of the present invention to provide a vibration system of a pickup cartridge capable of obtaining an adequate vertical tracking angle when the stylus tip is applied with a VTF.

Another object of the present invention is to provide a vibration system of the type as described above, which is arranged so that, in order to compensate for the displacement of the vertical tracking angle at the time the stylus tip is applied with a VTF, the stylus tip and the cantilever are preliminarily provided, during the nontracing condition, with a displacement in a direction opposite to that of the abovesaid displacement and in an amount equal to that of this latter displacement.

Still another object of the present invention is to provide a vibration system of the type as described above, which is arranged so that there can be utilized, during tracing, such behavior of the damper as centering around the zero cross of the stress-strain characteristic of the elastic member which constitutes the damper.

A further object of the present invention is to provide a vibration system of the type as described above, which is able to improve the quality of the sounds reproduced.

Yet another object of the present invention is to provide a vibration system of the type as described above, which allows the constituent members, such as damper and holder, of the vibration system to be machined easily.

DETAILED DESCRIPTION OF THE PREFERRED EMBODIMENT

The present invention will hereunder be described with respect to an embodiment by referring to FIGS. 4 to 9.

Figure 1:
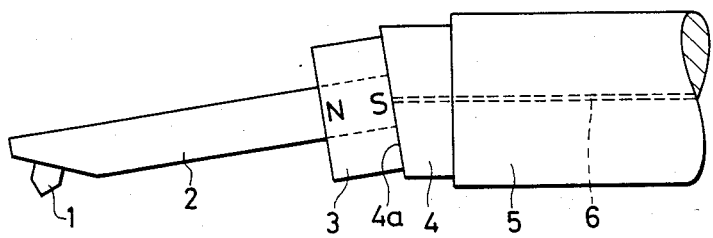
FIGS. 1 and 2 are diagrammatic side elevations of the vibration systems of conventional pickup cartridges, respectively.
Figure 2:
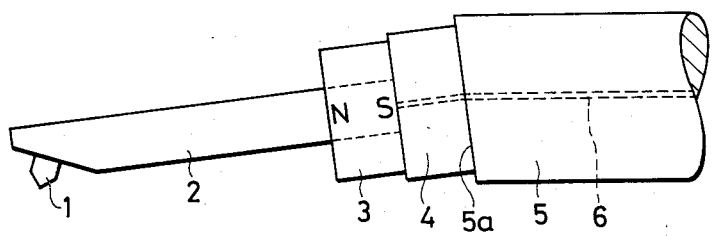
Figure 4:
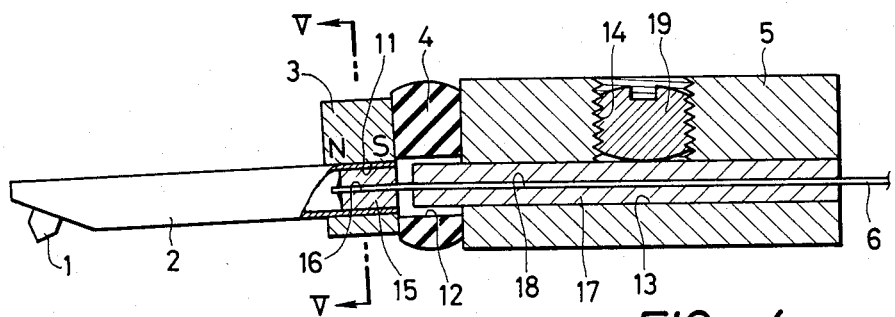
FIG. 4 is a diagrammatic vertical sectional view of a vibration system of a pickup cartridge according to the present invention.
Figure 5:
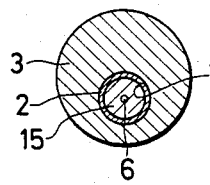
FIG. 5 is a diagrammatic cross sectional view taken along the line IV—IV in FIG. 4.

FIGS. 4 and 5 are figures showing the structure of the vibration system of a pickup cartridge according to the present invention. In these figures, like parts of FIGS. 1 and 2 are assigned with like reference numerals. FIGS. 4 and 5 show an embodiment wherein the present invention is applied to a moving magnet type pickup cartridge. It should be noted that the armature 3 shown therein is a magnet having an N pole and an S pole magnetized along the axial direction of a cantilever 2. This armature 3 is constructed in such manner that through a circular disc-like magnet having a uniform thickness, there is formed a through-hole 11 having its axial line parallel with its central axial line at a position displaced for a predetermined distance below the center of this magnet 3. A rearward end portion of the cantilever 2 is inserted and fixed within said through-hole 11 of the armature 3. A damper 4 is disposed at the rear end portion of the cantilever 2 and rearwardly of the armature 3. Furthermore, a holder 5 is disposed rearwardly of the damper 4. The damper 4, in turn, is constructed with a disc made of an elastic material such as a rubber or a synthetic rubber having a uniform thickness, through which is formed a through-hole 12 having its axial line parallel with its central axial line and being positioned for a predetermined distance below the central portion thereof. In the state shown in FIG. 4, the damper 4 is noted to be deformed as the cantilever 2 and the armature 3 are pulled toward the holder 5 side by a tension wire 6 as will be described later in further detail. Also, the holder 5 is constructed by a columnar member with a through-hole 13 having its axial line parallel with its central axial line and being positioned displaced for a predetermined distance below the central axis of the column, and also with a female screw hole 14 formed through the upper surface to reach said through-hole 13.

The cantilever 2 and the armature 3 are attached, with the intervention of the damper 4, to the holder 5. More particularly, a fixing member 15 is inserted and fixed within the rear end portion of the cantilever 2, and an end portion of the tension wire 6 is fixed within a central bore 16 of the fixing member 15. The other end side of the tension wire 6 is passed through and fixed within the central bore 18 of a wire sleeve 17 which, in turn, is inserted through the through-hole 13 of the holder 5 after passing through the through-hole 12 of the damper 4. The wire sleeve 17 is fixed to the holder 5 by a male screw 19 which, in turn, is screwed in the female screw hole 14.

Figure 6:
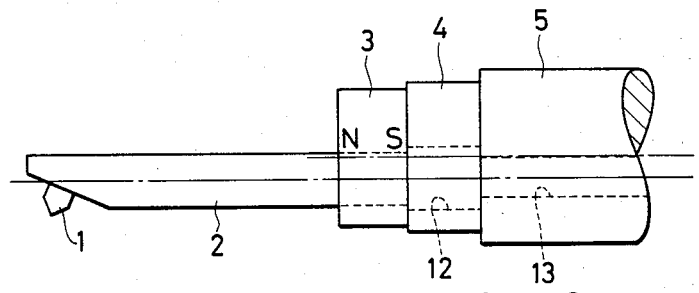
FIG. 6 is a diagrammatic explanatory view showing the steps of assembling the vibration system shown in FIG. 4.
Figure 7:
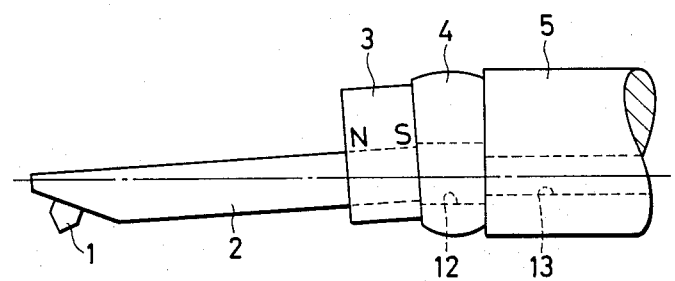
FIG. 7 is a diagrammatic explanatory view showing the state of the vibration system of FIG. 4 when no VTF is applied to the stylus tip.
Figure 8:
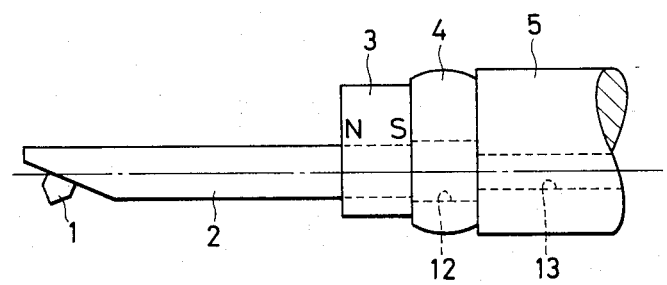
FIG. 8 is a diagrammatic explanatory view showing the state of the vibration system of FIG. 4 when a predetermined VTF is applied to the stylus tip.

In the assembly of the present invention the cantilever 2 and the armature 3 are secured to the holder 5 with the intervention of the damper 4. In assembling the above-mentioned vibration system, the first step is that, in the loosened state of the male screw 19, the respective central axial lines of the armature 3, the damper 4 and the holder 5 are aligned, and along therewith, the respective central axial lines of the cantilever 2, the through-hole 12 of the damper 4 and the through-hole 13 of the holder 5 are aligned (FIG. 6). In this state, the damper 4 is not deformed since no particular external force has been applied. Then, the wire sleeve 17 to which is fixed the tension wire 6 is jointly pulled rearwardly for a predetermined distance. In this state, the wire sleeve 17 is fixed to the holder 5 by a male screw 19. When the tension wire 6 is pulled rearwardly like this, the armature 3 is pulled rearwardly accordingly. Thus, the damper 4 is urged against the front surface of the holder 5 so that the damper 4 is compressed. In such case, it should be noted that, because of the fact that an end of the tension wire 6 is fixed to the rear end portion of the cantilever 2 at a position lower than the central position of the armature 3, the lower portion of the damper 4 is compressed more than is the upper portion thereof. Accordingly, in such case, a certain constant amount of downward displacement is imparted to both the stylus tip 1 and the cantilever 2 due to the deformation of the damper 4 as shown in FIG. 7. The amount of displacement which is imparted to the stylus tip 1 and the cantilever 2 in such instance is set so that, when the stylus tip 1 is applied with a predetermined VTF, the respective central axial lines of the cantilever 2, the through-hole 12 of the damper 4 and the through-hole 13 of the holder 5 are aligned as shown in FIG. 8.

It should be noted here that the vibration system of the pickup cartridge shown in FIG. 4 represents the state wherein a displacement is imparted to the stylus tip 1 and the cantilever 2.

Figure 9:
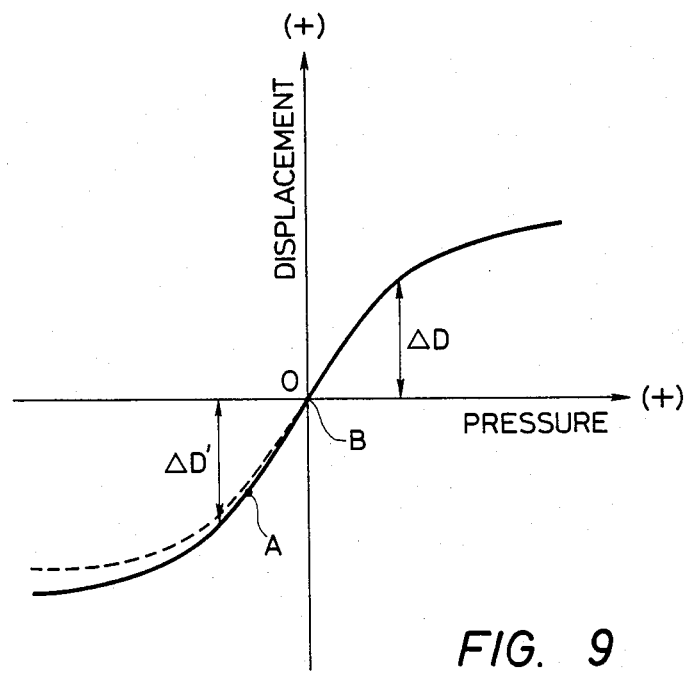
FIG. 9 is a chart showing the stress-strain characteristic of the damper of the vibration system shown in FIG. 4.

Here, the stress-strain characteristic of the damper 4 in the vibration system of the pickup cartridge shown in FIG. 4 will be considered. FIG. 9 shows a state in which an external force is applied to the damper 4 by the tension wire 6 prior to the application of a VTF, and that, accordingly, the stylus tip 1 and the cantilever 2 have become displaced downwardly for a predetermined amount and the damper 4 is pressure-biased to point A. Thus, when tracing, the potential (pressure-biasing point) moves to point B due to the VTF, presenting a zero cross potential state. In this way, at the time of tracing, there is exhibited symmetrical flexure (deformation) of the damper 4 for both the upward and downward movements of the stylus 1 (pressure changes in the rightgoing and leftgoing directions on the horizontal axis in FIG. 9), and accordingly the movement of the armature 3 is not at all impaired.

Figure 3:
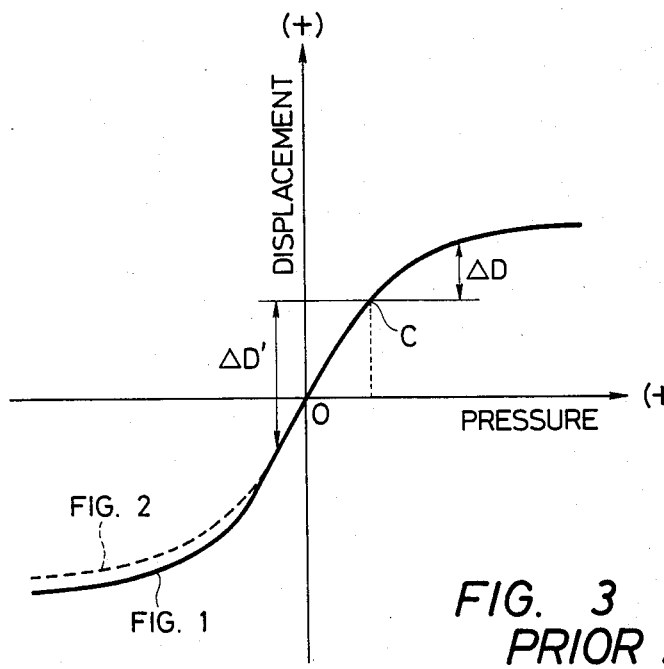
FIG. 3 is a chart showing the stress-strain characteristic of the damper utilized in the conventional vibration system shown in FIGS. 1 and 2.

It should be understood here that, in the above-mentioned embodiment, the damper 4 is of a vertically asymmetrical structure with regard to the upper and lower portions about the through-hole 12 thereof, and accordingly its stress-strain characteristic is somewhat asymmetrical relative to the positive and negative pressures applied, cf. note that the dotted line in FIG. 9 indicates a symmetrical stress-strain characteristic. However, this asymmetry is a very small amount when compared with that asymmetry relative to the positive and negative changes of the pressure (upgoing and downgoing movements of the stylus) in the conventional instance shown in FIG. 3 wherein a predetermined pressure bias is applied during tracing.

It should be understood also that, in the embodiment stated above, the planar configuration of the armature 3 is presented in a circular form, but that the planar configuration may be triangular, square, X-shape, cross shape or any other arbitrary shape.

Also, the application of the present invention is not limited to the vibration system of the moving magnet type pickup cartridge alone, but it may be applied equally effectively also to the vibration system of pickup cartridges of various other types. For example, the present invention may be applied to the vibration system of a moving iron type pickup cartridge. In such case, it is only necessary to form the armature with a magnet-permeable material.

What is claimed is:

1. A vibration system of a pickup cartridge of a record player, comprising:
   a cantilever having a stylus tip at its forward end portion;
   an armature secured to a rear end portion of said cantilever;
   a damper disposed rearwardly of both the rear end portion of said cantilever and said armature;
   a tension wire coupled to a rear end portion of said cantilever to rearwardly pull said cantilever; and
   a holder for holding a rear end portion of said tension wire;
   said damper being positioned between the rear end portion of said cantilever and said holder;
   said armature, said damper and said holder being disposed so that their respective central axial lines are in alignment, and said tension wire is disposed along an axial line displaced downwardly of said aligned central axial lines.

2. A vibration system according to claim 1, in which:
   said armature, said damper and said holder are of a circular shape.

3. A vibration system according to claim 1, in which:
   said cantilever has a tubular rear end portion, and
   said tension wire has a forward end portion fixed to a fixing member secured within the tubular rear end of said cantilever.

4. A vibration system according to claim 1, in which:
   said holder has a through-hole formed along an axial line displaced below its central axial line, and a screw hole formed to extend from its periphery to said through-hole, and
   said tension wire is provided with a wire sleeve around its rear end portion, and is fixed, under tension, to said holder via said wire sleeve by a screw engaged in said screw hole.

5. A system as in claim 1 wherein said armature is a magnet.

6. A system as in claim 1 wherein said armature is made of a magnet-permeable material.

7. A system as in claim 2 wherein said armature is a magnet.

8. A system as in claim 2 wherein said armature is made of a magnet-permeable material.

9. A system as in claim 3 wherein said armature is a magnet.

10. A system as in claim 3 wherein said armature is made of a magnet-permeable material.

11. A system as in claim 4 wherein said armature is a magnet.

12. A system as in claim 4 wherein said armature is made of a magnet-permeable material.

* * * * *